(12) United States Patent
Kim et al.

(10) Patent No.: US 9,108,572 B2
(45) Date of Patent: Aug. 18, 2015

(54) BUMPER CARRIER DEVICE FOR VEHICLE

(71) Applicant: Hyundai Motor Company, Seoul (KR)

(72) Inventors: Hyun Gyung Kim, Hwaseong-si (KR); Bock Cheol Lee, Suwon-si (KR); Seung Mok Lee, Osan-si (KR); Phil Jung Jeong, Yongin-si (KR); Young Sub Oh, Suwon-si (KR); Dong Eun Cha, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/319,465

(22) Filed: Jun. 30, 2014

(65) Prior Publication Data

US 2015/0165981 A1  Jun. 18, 2015

(30) Foreign Application Priority Data

Dec. 13, 2013  (KR) ........................ 10-2013-01 55495

(51) Int. Cl.
*B60R 9/00* (2006.01)
*B60R 19/48* (2006.01)
*B60R 9/06* (2006.01)

(52) U.S. Cl.
CPC ........................................ *B60R 9/06* (2013.01)

(58) Field of Classification Search
CPC .......... B60R 9/00; B60R 9/06; B60R 19/023; B60R 19/02
USPC .......... 224/512, 504, 514, 516, 924; 293/117, 293/102, 115; 248/222.51, 223.31
See application file for complete search history.

(56) References Cited

U.S. PATENT DOCUMENTS

| | | | | | |
|---|---|---|---|---|---|
| 1,780,277 | A | * | 11/1930 | Seeley et al. | 410/8 |
| 3,176,903 | A | * | 4/1965 | Farley | 224/490 |
| 3,796,333 | A | * | 3/1974 | Goldstein | 414/462 |
| 4,204,701 | A | * | 5/1980 | Oltrogge | 280/491.5 |
| 4,610,458 | A | * | 9/1986 | Garnham | 280/495 |
| 4,806,308 | A | * | 2/1989 | Kamiya et al. | 420/530 |
| 4,950,010 | A | * | 8/1990 | Denny | 293/117 |
| 6,398,276 | B1 | * | 6/2002 | Smith | 293/142 |
| 6,457,733 | B1 | * | 10/2002 | Hansen | 280/481 |
| 6,579,055 | B1 | * | 6/2003 | Williams | 414/462 |

(Continued)

FOREIGN PATENT DOCUMENTS

| | | |
|---|---|---|
| KR | 1998-048681 U | 9/1998 |
| KR | 2002-0004720 A | 1/2002 |

(Continued)

*Primary Examiner* — Justin Larson
*Assistant Examiner* — Lester L Vanterpool
(74) *Attorney, Agent, or Firm* — Morgan, Lewis & Bockius LLP

(57) ABSTRACT

A bumper carrier device for a vehicle may include a carrier bar, two towing brackets, a bracket rotating unit and a linking unit. The carrier bar may extend in a left and right direction. The two towing brackets may be separated from each other, be rotatably mounted to the carrier bar, protrude toward a body of a vehicle and be provided with screws at leading ends. The bracket rotating unit may be mounted to the carrier bar and rotates one of the towing brackets relative to the carrier bar to couple or decouple the one of the towing brackets to or from the vehicle. The linking unit may transmit operational force of the bracket rotating unit to the remaining towing bracket to couple or decouple the remaining towing bracket to or from the vehicle.

5 Claims, 4 Drawing Sheets

(56) References Cited

U.S. PATENT DOCUMENTS

2004/0040995 A1* 3/2004 Ferrigan .................. 224/512
2004/0041417 A1* 3/2004 Ferrigan .................. 293/117
2013/0147215 A1   6/2013 Hardy et al.

FOREIGN PATENT DOCUMENTS

| KR | 10-0773082 B1 | 11/2007 |
| KR | 10-0822998 B1 | 4/2008 |
| KR | 1020130096820 A | 9/2013 |

* cited by examiner

BUMPER CARRIER DEVICE FOR VEHICLE

CROSS-REFERENCE TO RELATED APPLICATION

The present application claims priority of Korean Patent Application Number 10-2013-0155495 filed on Dec. 13, 2013, the entire contents of which application are incorporated herein for all purposes by this reference.

BACKGROUND OF INVENTION

1. Field of Invention

The present invention relates to a bumper carrier device for a vehicle, and more particularly to a bumper carrier device for a vehicle which can be rapidly and easily attached to and removed from a vehicle.

2. Description of Related Art

In order to enable a vehicle to carry an object which is difficult to be loaded in a vehicle, such as a bicycle, a carrier is used. That is, a carrier is fixed to the body of a vehicle and holds an object to be carried so that the vehicle can carry the object.

Such a carrier needs to be fixed to the body of a vehicle while the vehicle is carrying an object but it is good for the carrier to be removed from the body of a vehicle when the carrier is not in use, in terms of appearance and fuel efficiency. Accordingly, the carrier needs to be easily attached to and removed from the body of a vehicle, and also needs to be firmly fixed to the body of a vehicle when the carrier is in use.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a bumper carrier device for a vehicle which can be rapidly and easily attached to and removed from the body of a vehicle, can be firmly fixed to the body of a vehicle while it is used, enables a user to rapidly and easily load an object on the bumper carrier device, and can hold the object in a stably loaded state.

According to various aspects, there is provided a bumper carrier device for a vehicle, including: a carrier bar that extends in a left and right direction; two towing brackets which are separated from each other, are rotatably mounted to the carrier bar, protrude toward a body of a vehicle, and are provided with screws at leading ends thereof, respectively; a bracket rotating unit that is mounted to the carrier bar and rotates one of the towing brackets relative to the carrier bar to couple or decouple the one of the towing brackets to or from a bumper back beam of the vehicle in a screwed manner; and a linking unit that transmits operational force of the bracket rotating unit to the remaining towing bracket to couple or decouple the remaining towing bracket to or from the bumper back beam of the vehicle.

The bumper carrier device for a vehicle according to the present invention can be rapidly and easily attached to and removed from the body of a vehicle, can be firmly fixed to the body of a vehicle while it is used, enables a user to rapidly and easily load an object on the bumper carrier device, and can stably hold the object in a loaded state.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1:
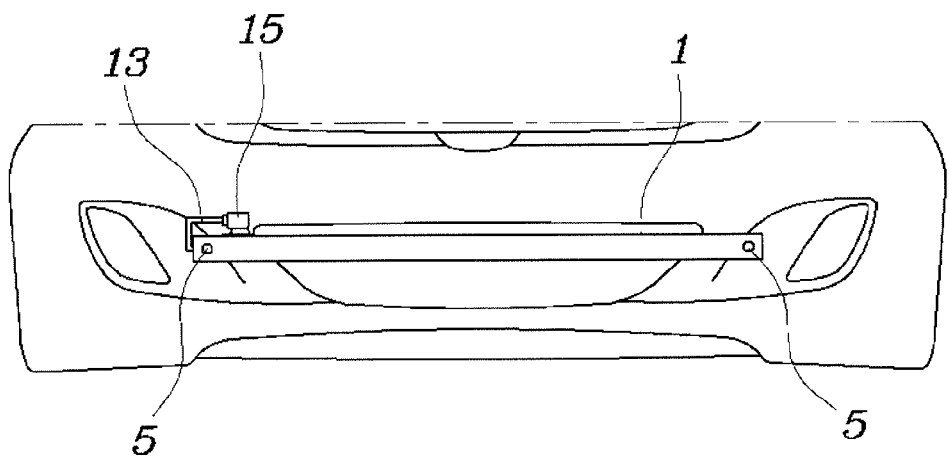
FIG. 1 is a view illustrating a state in which an exemplary bumper carrier device for a vehicle according to the present invention is mounted to a rear bumper of a vehicle.
Figure 2:
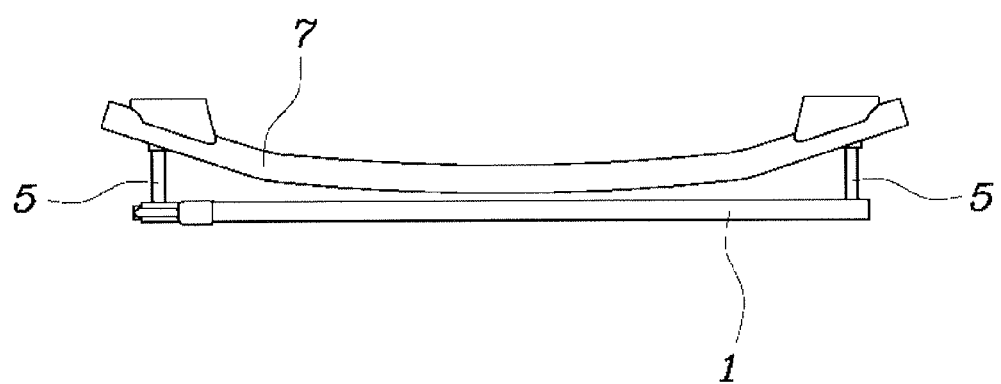
FIG. 2 is a top view illustrating the bumper carrier device of FIG. 1, in which a bumper of a vehicle is omitted for illustration purpose and the bumper carrier device is attached to a bumper back beam.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to FIGS. 1 to 6, a bumper carrier device for a vehicle according to various embodiments includes a carrier bar 1 which extends laterally or in a left and right direction, and two towing brackets 5 which are distanced from each other, are rotatably mounted to the carrier bar 1, protrude toward a body of a vehicle, and are provided with screws 5-1 at leading ends thereof. The bumper carrier device for a vehicle further includes a bracket rotating unit which is mounted on the carrier bar 1 and which rotates any one of the towing brackets 5 relative to the carrier bar 1 to make the rotated towing bracket 5 be coupled to the a bumper back beam 7 of a vehicle in a screwed manner. The bumper carrier device yet further includes a linking unit which transmits operational force of the bracket rotating unit to the remaining towing bracket 5 which is not rotated.

An object to be loaded on a vehicle and to be carried is fixed to the body of a vehicle using the carrier bar 1. The carrier bar 1 is fixed to the body of a vehicle using the two towing brackets 5. The bracket rotating unit and the linking unit enable the carrier bar 1 to be rapidly, easily, and firmly attached to and removed from the body of a vehicle.

The linking unit according to the present embodiment includes teeth portions 5-2 formed in the two towing brackets 5 and a gear belt 11 which extends to surround or at least partially surround the teeth portions 5-2 of the two towing brackets 5. When the gear belt 11 is driven, the two towing brackets 5 are rotated in the same direction by the teeth portions 5-2.

The bracket rotating unit according to the present embodiment includes a pivoting lever 13 which enables a user to apply operational force, a worm 15 which is rotated by rotational force of the pivoting lever 13, and a worm wheel 17 which is meshed with the worm 15 and rotated along with the rotation of the worm 15 so that the gear belt 11 can be driven. The worm 15 and worm wheel 17 are rotatably fixed to the carrier bar 1 via a support.

The pivoting lever 13 includes a lever shaft 13-1 which is fixed to the worm 15 and a lever arm 13-2 which extends from an end of the lever shaft 13-1 in a radial direction. A handle 19 to be held by a user's hand is rotatably connected to a leading end of the lever arm 13-2 of the pivoting lever 13.

Figure 3:
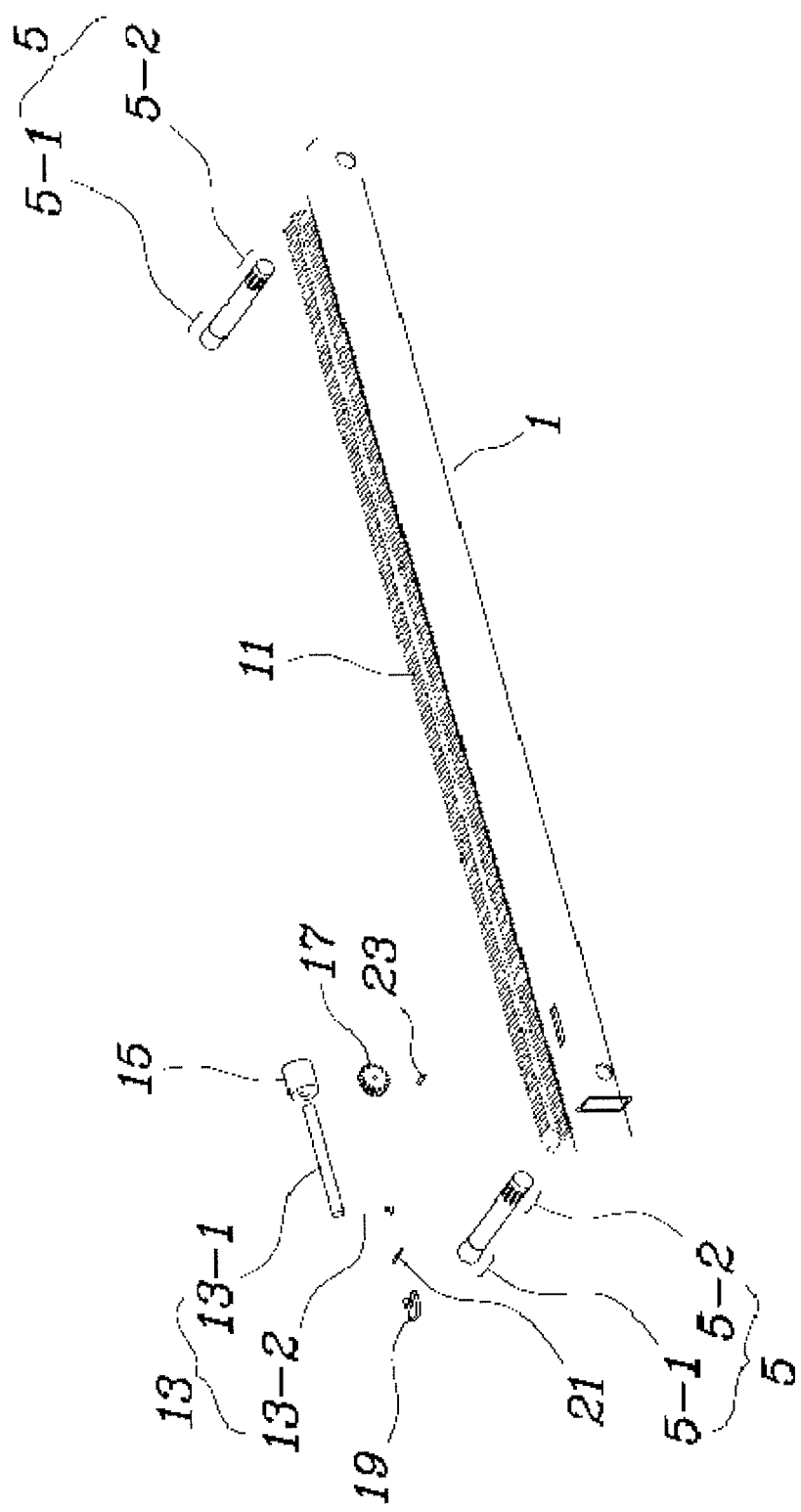
FIG. 3 is an exploded perspective view illustrating the bumper carrier device of FIG. 1.
Figure 4:
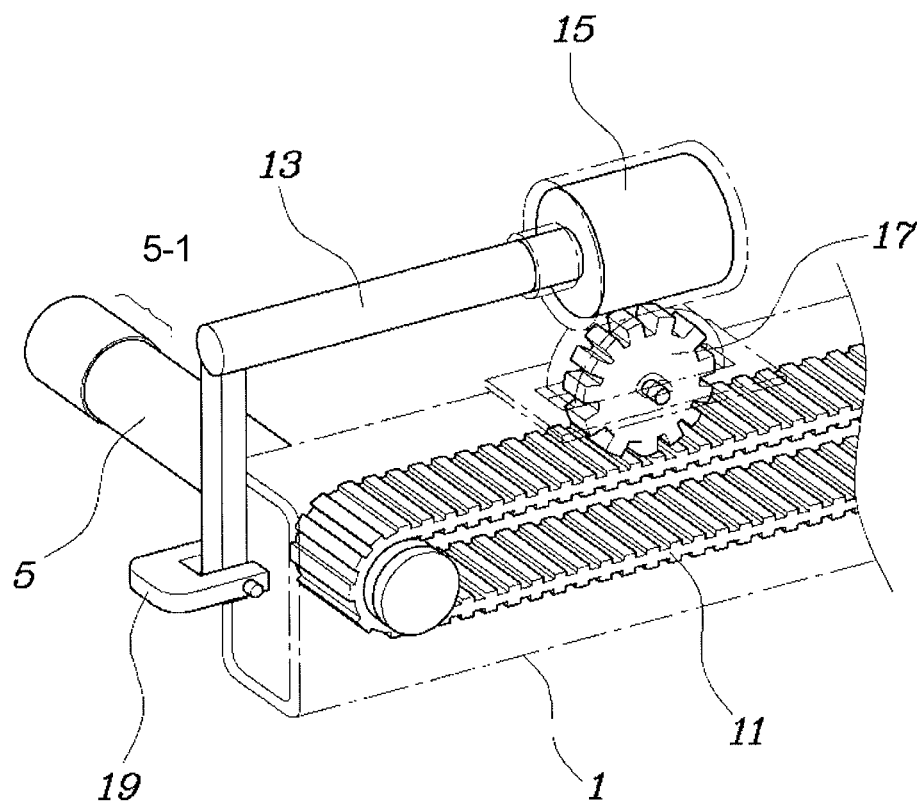
FIG. 4 is a view illustrating a main part of an exemplary bumper carrier device for a vehicle according to the present invention.

With reference to FIG. 3, the handle 19 is rotatably connected to the lever arm 13-2 using a hinge pin 21 and the worm wheel 17 is combined with a rotating shaft 23. When a user holds the handle 19 and rotates the lever arm 13-2, the rotational force of the lever arm 13-2 rotates the worm 15 and consequently the rotational force of the worm 15 drives the worm wheel 17. This operation causes the gear belt 11 to be driven, causing the two towing brackets 5 to be rotated.

As a user rotates the lever arm 13-2 in a state where the carrier bar 1 is positioned in back of a rear bumper so that the two towing brackets 5 can pass through the bumper and be screwed with the screw 5-1 disposed at an end of the bumper back beam 7, the carrier bar 1 can be rapidly, easily, and firmly fixed to the rear bumper.

Figure 6:
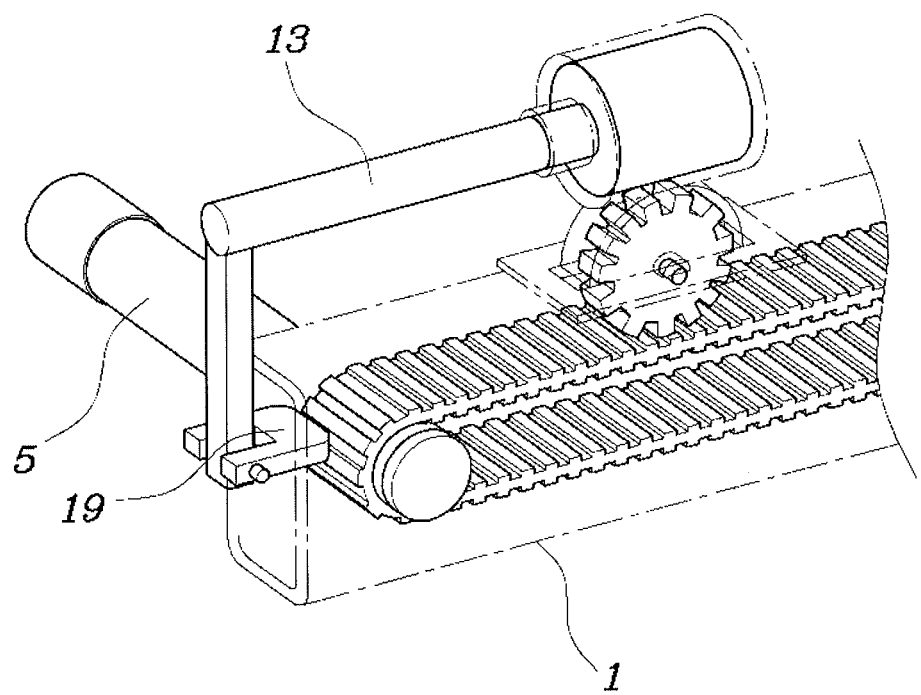
FIG. 6 is a view illustrating a state in which an exemplary bumper carrier device is completely fixed by using a handle as compared with FIG. 5.

The lever shaft 13-1 of the pivoting lever 13 is installed to extend along the longitudinal direction of the carrier bar 1 and protrude toward one end of the carrier bar 1. When the handle 19 is pivoted toward the carrier bar 1 from the leading end of the lever arm 13-2 of the pivoting lever 13 as illustrated in FIG. 6, the gear belt 11 is fixed so that the towing brackets 5 cannot be rotated. In this way, the carrier can be firmly attached.

Figure 5:
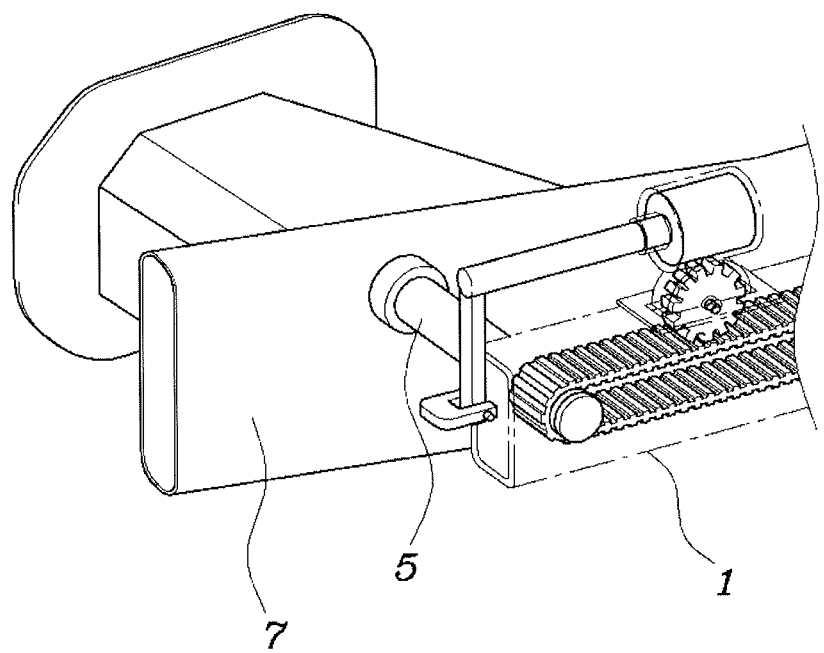
FIG. 5 is a view illustrating a state in which an exemplary bumper carrier device is fixed to the bumper back beam.

On the other hand, the carrier can be removed as follows. The handle 19 is expanded as illustrated in FIG. 5, and the pivoting lever 13 is reversely rotated. Then, the two towing brackets 5 are simultaneously rotated. As a result, the two towing brackets 5 are removed from the bumper back beam 7. In this way, the carrier can be rapidly and easily removed from the bumper.

For convenience in explanation and accurate definition in the appended claims, the terms "left" or "right", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper carrier device for a vehicle, comprising:
    a carrier bar that extends in a left and right direction;
    two towing brackets which are separated from each other, are rotatably mounted to the carrier bar, protrude toward a body of a vehicle, and are provided with screws at leading ends thereof, respectively;
    a bracket rotating unit that is mounted to the carrier bar and rotates one of the towing brackets relative to the carrier bar to couple or decouple the one of the towing brackets to or from a bumper back beam of the vehicle in a screwed manner; and
    a linking unit that transmits operational force of the bracket rotating unit to the remaining towing bracket to couple or decouple the remaining towing bracket to or from the bumper back beam of the vehicle.

2. The bumper carrier device for a vehicle according to claim 1, wherein the linking unit includes:
    teeth portions formed in the two towing brackets; and
    a gear belt extended to surround at least partially the teeth portions of the two towing brackets.

3. The bumper carrier device for a vehicle according to claim 2, wherein the bracket rotating unit includes:
    a pivoting lever to which a rotational operation force is to be applied;
    a worm which is rotated by rotational force of the pivoting lever; and
    a worm wheel which is meshed with the worm and rotated in accord with the rotation of the worm, thereby driving the gear belt.

4. The bumper carrier device for a vehicle according to claim 3, wherein the pivoting lever includes:
    a lever shaft fixed to the worm at one end;
    a lever arm extending from an end of the lever shaft in a radial direction; and
    a handle rotatably installed at a leading end of the lever arm.

5. The bumper carrier device for a vehicle according to claim 4, wherein the lever shaft of the pivoting lever extends along a longitudinal direction of the carrier bar and protrudes toward the carrier bar, and wherein the gear belt is fixed when the handle is pivoted toward the carrier bar from the leading end of the lever arm of the pivoting lever.

\* \* \* \* \*